United States Patent [19]

Shimzu et al.

[11] 4,139,847
[45] Feb. 13, 1979

[54] AUTOMATIC GROUND-CLUTTER REJECTION IN WEATHER PULSE RADAR SYSTEM

[75] Inventors: Toshio Shimzu; Shuichi Goto, both of Mitaka, Japan

[73] Assignee: Japan Radio Company, Limited, Tokyo, Japan

[21] Appl. No.: 806,679

[22] Filed: Jun. 15, 1977

[30] Foreign Application Priority Data

Jun. 16, 1976 [JP] Japan .................................. 51-70508

[51] Int. Cl.² .............................................. G01S 9/60
[52] U.S. Cl. .................................................... 343/5 W
[58] Field of Search ....................................... 343/5 W

[56] References Cited

U.S. PATENT DOCUMENTS

| | | | |
|---|---|---|---|
| 2,736,020 | 2/1956 | Atlas ............................... | 343/5 W X |
| 3,160,816 | 12/1964 | Cunningham et al. .......... | 343/5 W X |
| 3,176,293 | 3/1965 | Nolen et al. ...................... | 343/7.7 X |
| 3,287,726 | 11/1966 | Atlas ................................ | 343/5 W X |
| 3,390,390 | 6/1968 | Vehrs, Jr. .......................... | 343/16 M |
| 3,618,087 | 11/1971 | Smith et al. ...................... | 343/7.7 |
| 3,634,859 | 1/1972 | Wolf ................................. | 343/7.7 |

OTHER PUBLICATIONS

"A New Method of Hail Detection by Dual-Wavelength Radar" by P. J. Eccles et al, reprints of the papers presented at the 14th Radar Meteorology Conference, Tuson, Ariz. (17-20 Nov. 1970), S2768-0158, Department of Geophisical Sciences, The University of Chicago, pp. 1≠6.

Primary Examiner—Malcolm F. Hubler
Attorney, Agent, or Firm—Flynn & Frishauf

[57] ABSTRACT

Ground clutter is automatically eliminated from echo signals in a weather pulse radar system to provide signals having an amplitude corresponding to the average intensity of the weather echo over a number of pulses. The reflected waves received in the receiver are linear-detected to provide echo signals. Each one of successive echo signals is compared with another later one which is apart from the each one echo signal by a predetermined time period during which fluctuation of weather target becomes independent, to derive an AC component signal corresponding to the fluctuation. The variance of the amplitude of the derived signal is proportional to the mean power of the weather echo. Thus, the ground clutter and the DC component of the weather echo are eliminated. The AC component signals are unipolarized and, thereafter, averaged. The averaged signals have an amplitude corresponding to the average intensity of the weather echo.

These averaged signals may be logarithmic-converted to provide logarithmic signals similar as in weather radar system employing radar receivers having a logarithmic characteristic.

14 Claims, 10 Drawing Figures

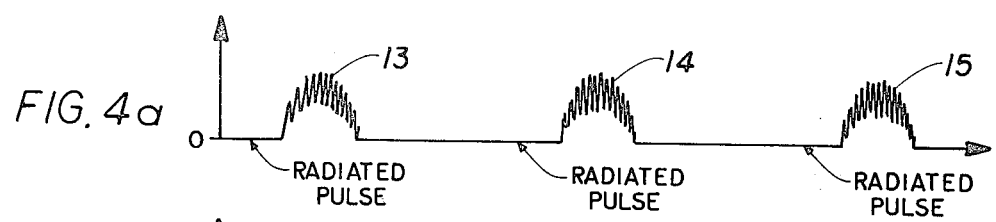
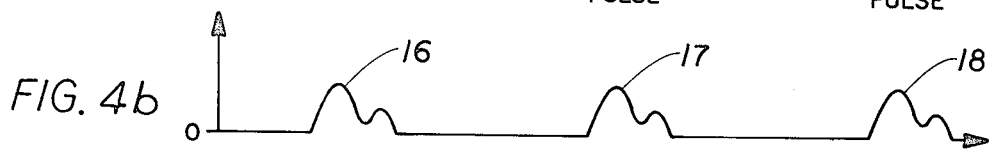
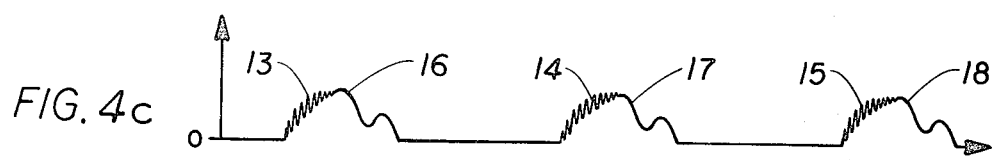
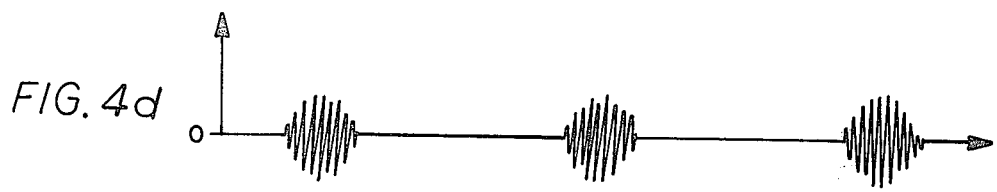
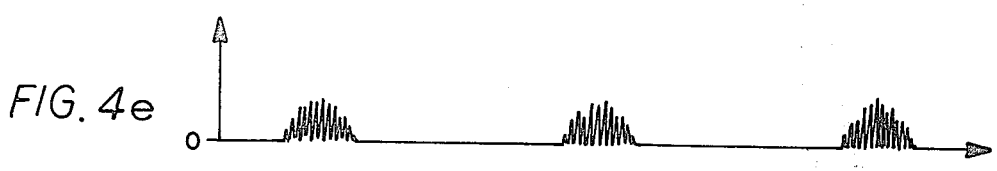

AUTOMATIC GROUND-CLUTTER REJECTION IN WEATHER PULSE RADAR SYSTEM

BACKGROUND OF THE INVENTION

This invention relates to weather radar systems for obtaining rain information by radiating microwave pulses from a radar transmitter and receiving echo signals from weather targets at a radar receiver, and, in particular, to rejection of echo signals from fixed targets such as the ground (which are hereinafter referred to as "ground clutter") included in the received signals.

In weather radar system, microwave pulses are radiated with a certain repetition frequency from the transmitter and echo signals from weather targets are received at the receiver. The received wave is envelope-detected to provide an echo signal corresponding to each pulse radiation.

The reflection intensity of particles of the weather target within an echoing volume varies and, therefore, the amplitude of the echo signal fluctuates rapidly from one pulse to the next. But since the particles, or rain drops, are randomly distributed within the echoing volume, the average echo intensity over a number of pulses is the sum of echo intensities of individual particles.

Therefore, physical properties of the weather such as rain amount can be detected by measuring the average echo intensity, or mean power of the weather echo signals over a number of pulses.

The echo signals which are successively provided accordingly to radiated pulses, are averaged and applied to an indicator to display the geometric pattern and motion of weather targets such as rain, clouds, storms and so on.

As indicators there are known a plan position indicator (PPI), an A-scope indicator and others.

As well known in the prior art, since the average intensity of a weather echo depends on, for example the rain amount, the amplitude of the averaged signal in the radar receiver enables one to know rain amount. Therefore, for example, the rain amount at a certain distance from the radar can be seen from the brightness of the pattern on the PPI scope. Furthermore, an iso-echo indicator is used to display an iso-rain pattern by slicing the averaged signals at a predetermined amplitude level.

Moreover, the echo signals or the averaged signals are inputted into a computer or a data processing device to obtain various weather information.

One of the difficult problems in weather radar systems is rejection of ground clutter. The reflected wave received at the radar receiver includes echoes from fixed objects such as mountains, buildings and other objects on the ground (this echo is referred to as "ground clutter"), besides weather echos. The ground clutter intrudes in echo signals of the weather target to make it difficult to obtain the weather pattern and other information from the echo signals.

To eliminate the ground clutter, the radar observer or the meteorologist must draw the weather pattern viewing the pattern on the PPI scope, and use his own experience and knowledge.

One of the known methods for eliminating ground clutter is to use a memory storing ground echoes at fine weather, and to subtract the stored ground clutter signal from echoes observed at rain. In this method, a large capacity memory device is required to store ground clutter at various directions and ranges. For example, to store a ground clutter pattern within 300 Km around the radar device, a memory capacity of 108,000 words is required when the sampling period in the distance and the bearing are 1 Km and 1°, respectively, with a wave, or antenna, elevation angle being fixed. In this method, since the stored ground echoes must be subtracted from the observed echoes, an expensive computer is required for the operation and real time processing is impossible.

Furthermore, the effective elimination of ground clutter cannot be achieved, because the intensity of ground echoes considerably varies for several hours dependent on the change of the electric wave propagation condition, and of the water content of the ground, woods, buildings and others.

Another known method for removing the effects of ground clutter is to abandon the echo signals including ground clutter by detecting the existence of ground clutter. The detection is achieved by observing an unchanging component within successive echo signals on the basis that the amplitude of ground clutter does not change for a short time period such as the radiated pulse to pulse interval. But in this method almost all data obtained by the radar is abandoned in a certain area so that the weather observation by the use of the radar is impossible in the area.

SUMMARY OF THE INVENTION

Therefore, an object of this invention is to provide a method and a device for rejecting ground clutter included in the echo signals obtained by the weather radar.

An important object of this invention is to provide a method and a device for obtaining signals corresponding to reflection intensities of weather targets from echo signals received at the weather radar receiver and for eliminating ground clutter included in the echo signals.

Another object of this invention is to achieve above objects with simple steps and simple circuit formations.

This invention is based on our knowledge that the mean power of the echo from a weather target is proportional to the variance of the amplitude of the linear-detected signals of the received wave at the radar receiver, in no relation to the existence of any ground clutter, and that in successive signals having amplitude fluctuation, the variance of the difference signals between each one signal and another which are apart from one another by a time period during which the fluctuation becomes independent is proportional to the variance of the amplitude of the successive signals.

Accordingly, in this invention, the received wave in the weather radar receiver is linear-detected and each one of successive pulses obtained by the linear-detection is compared with each next one to provide difference signals as signals corresponding to fluctuation of the weather target. The variance of the difference signal is proportional to the mean power of the weather echo. Therefore, the difference signals give signals corresponding to the average intensity of the weather echo wherein the ground clutter is effectively eliminated.

The difference signals are unipolarized and, thereafter, are averaged. The averaged signals have an amplitude corresponding to the average intensity of the weather echo. Therefore, the display of the weather pattern, the observation of the rain amount and other analysis can be readily and accurately made employing the averaged signals according to the known technique and devices.

The difference signals are, in other ways, squared and, thereafter are averaged. The averaged signals have, also, an amplitude corresponding to the average intensity of the weather echo.

Comparison of the two linear-detected pulses may be made between two pulses at one or more pulse repetition intervals.

To carry out the comparison, known comparing circuits such as the canceler circuits in the coherent-processing MTI system may be used. A typical comparator comprises a delay line and a subtractor. To unipolarize the difference signal, a unipolarizer is used. An example of the unipolarizer is a full-wave rectifier. To average signals, a known averager, for example, a video integrator is used. For squaring signals, a square-law device having the transfer characteristic $y = ax^2$ is used. Such a device may be formed by a known amplitude multiplier.

The averaged signals may be logarithmic-converted to provide usual logarithmic amplitude signals.

Further objects and features of this invention will be clearly understood by following descriptions of preferred embodiments of this invention in reference to the annexed drawings.

BRIEF DESCRIPTION OF THE DRAWINGS

FIG. 4a–4f shows signal waveforms in various points in the embodiment in FIG. 2.

DETAILED DESCRIPTIONS OF PREFERRED EMBODIMENTS

Figure 1:
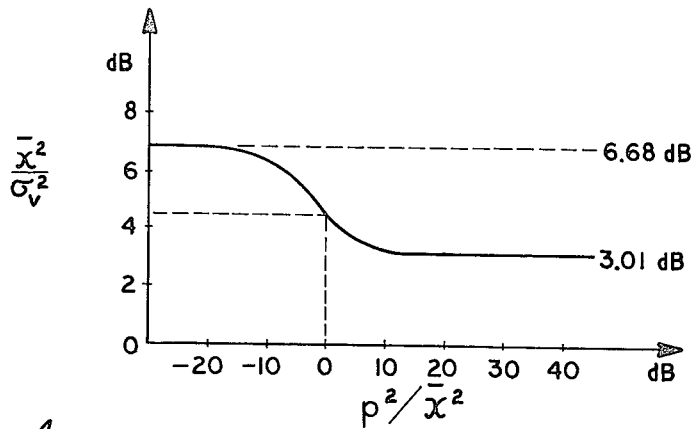
FIG. 1 graphically shows a response of $\overline{x}^2/\sigma_v^2$ to the variation of $p^2/\overline{x}^2$.

In weather pulse radar, microwave pulses are radiated from a transmitter with predetermined intervals and the echo signals from weather targets in response to the radiated pulses are received in a radar receiver. Thus, the intensity of the weather target is obtained as the average of the echo signal over a number of pulses.

Now, considering an echo signal from a certain echoing volume at a certain range, when the received wave in the radar receiver is linear-detected, the probability density function $p(x)$ of the amplitude $x$ of the echo signal subjects to the Rayleigh distribution as given by following equation (1), $$p(x)dx = \frac{x}{\sigma^2} \exp(-\frac{x^2}{2\sigma^2})dx \qquad (1)$$

wherein, $x \geq 0$.

Therefore, the mean square value $\overline{x}^2$ of the echo signal is given by, $$\overline{x}^2 = \int_0^\infty x^2 p(x)dx = 2\sigma^2 \qquad (2)$$

And, if the mean value of the amplitude $x$ is $\overline{x}$, the variance $\sigma_x^2$ of the amplitude is given by the equation (3), $$\sigma_x^2 = \int_0^\infty (x - \overline{x})^2 p(x)dx = 2(1 - \frac{\pi}{4})\sigma^2 \qquad (3)$$

It will be seen that the variance $\sigma_x^2$ represents the effective quantity of random fluctuation of the echo signal.

In weather radar, since the amplitude $x$ has a dimension of the electric potential or voltage and is observed as a function of time $x(t)$, the variance $\sigma_x^2$ and the mean square value $\overline{x}^2$ has a dimension (or units) of electric power. Therefore, the variance $\sigma_x^2$ and the mean square value $\overline{x}^2$ will be referred as an AC power and a mean power, respectively.

From equations (2) and (3), it is seen that the ratio of the mean power of the weather echo to the AC power of the weather echo (or $\overline{x}^2/\sigma_x^2$) is constant as shown by following equation (4);

$$\frac{\overline{x}^2}{\sigma_x^2} = \frac{1}{1 - \frac{\pi}{4}} = 4.66 \ (\approx 6.68 \text{ dB}) \qquad (4)$$

Accordingly, if the AC power of the weather echo can be detected, it will be noted that the mean power of the weather echo can be obtained from the AC power.

In the above statements, it is assumed that no ground clutter is included in the received wave.

Analysis will be made about a case where the ground clutter exists together with the echo signal.

The amplitude $x(t)$ of weather echo inputted into the radar antenna at a time $t$ is given by the following equation (5);

$$x(t) = X(t)\cos[\omega_c t + \phi(t)] \qquad (5)$$

where $\omega_c$ is an average angular frequency of the weather echo, $X(t)$ is a random variable subjecting to the Rayleigh distribution, and $\phi(t)$ is another variable to be uniformly distributed.

If the transmitting angular frequency in the weather radar is $\omega_t$ and if the average Dopplar angular frequency shift of the weather echo is $\omega_d$, $$\omega_c = \omega_t + \omega_d \qquad (6)$$

where $\omega_d << \omega_t$.

On the other hand, the amplitude $g(t)$ of the ground clutter at a time $t$ is given by the equation (7), $$g(t) = P\cos\omega_t t = P\cos(\omega_c t - \omega_d t) \qquad (7)$$

where $P$ is constant for a short time period.

Therefore, the composite wave $y(t)$ of the weather echo and the ground clutter at the antenna input is written by the following equation;

$$y(t) = P\cos(\omega_c t - \omega_d t) + x(t) \qquad (8)$$

Now, if the envelope amplitude of the composite wave is represented by $V(t)$, the composite wave $y(t)$ is rewritten as follows, $$y(t) = V(t)\cos[\omega_c t + \phi(t)] \qquad (9).$$

In the radar receiver, the composite wave is IF-converted and linear-detected to provide an output signal having an amplitude in proportion to $V(t)$.

The probability density function of the output V(t) or the probability of $V(t) = V_t$ is known as given by the following equation, $$p(V_t) = \frac{V_t}{\sigma^2} \exp\left(-\frac{V_t^2 + P^2}{2\sigma^2}\right) I_0\left(\frac{PV_t}{\sigma^2}\right) \quad (10)$$

where $V_t \geq 0$, $I_0(x)$ being a modified Bessel function.

Now if the mean value of the linear-detection output $V_t$ is represented by $\overline{V_t}$, the variance $\sigma_v^2$ of the output $V_t$ is represented by, $$\sigma_v^2 = \int_0^\infty (V_t - \overline{V_t})^2 p(V_t) dV_t \quad (11)$$

where $\sigma_v^2$ represents the AC power of the linear-detection output V(t).

When no ground clutter exists or $P = 0$, the output V(t) is seen to be Rayleigh distributed as shown by the equation (1).

When the mean power of the weather echo is sufficiently smaller than the power of the ground clutter, that is $P^2 >> \overline{x^2}$, $P^2 >> \sigma^2$ as seen from the equation (2). And if $P^2 >> \overline{x^2}$, $P \approx V_t$, therefore $P^2 \approx PV_t >> \sigma^2$. Accordingly, the $p(V_t)$ in the equation (10) is approximately rewritten as follows, $$p(V_t) = \frac{1}{\sigma}\left(\frac{1}{2\pi}\right)^{\frac{1}{2}} \exp\left[-\frac{(V_t - P)^2}{2\sigma^2}\right] \quad (12)$$

where $V_t \geq 0$.

The derivation of the equations (9)–(12) are described in "An Introduction to the Theory of Random Signals and Noise", pp. 165–166 by Davenport, McGRAW-HILL 1958.

It is noted that the equation (12) shows the Gaussian distribution. And at the time, $\sigma_v^2 = \sigma^2$.

Therefore, when the ground clutter is sufficiently greater than the weather echo, the ratio of the mean power $(\overline{x^2})$ of the weather echo to the AC power $(\sigma_v^2)$ of the linear-detection output V(t) is given as follows;

$$\frac{\overline{x^2}}{\sigma_v^2} = \frac{2\sigma^2}{\sigma^2} = 2 \;(\approx 3.01 \text{ dB}) \quad (13)$$

When no ground clutter exists, the ratio $(\overline{x^2}/\sigma_v^2)$ is 4.66 ($\approx$ 6.68 dB) as given by the equation (4), because $\sigma_v^2 = \sigma_x^2$.

It is noted that the effective AC power of the linear-detection output changes by 3.67 dB at maximum by the variation of the power of the ground clutter, even if the mean power of the weather echo is constant.

In order to clarify the change of the AC power $\sigma_v^2$ of the linear-detection output corresponding to the reduced ground clutter power $P^2$, the response of $\overline{x^2}/\sigma_v^2$ to the variation of $P^2/\overline{x^2}$ is shown in FIG. 1, which was obtained by calculation.

Referring to FIG. 1, $\overline{x^2}/\sigma_v^2$ increases if the power ($P^2$) of the ground clutter reduces from sufficient greater value.

Therefore, if the AC power $\sigma_v^2$ of the linear-detection output is measured, the mean power $\overline{x^2}$ of the weather echo can be calculated. To this end, it is required to know the value of $P^2$. But even if the power ($P^2$) of the ground clutter is unknown, $\overline{x^2}$ can be approximately calculated from the measured value of $\sigma_v^2$ by the use of the average (4.85 dB) of the maximum value (6.68 dB) and the minimum value (3.01 dB) of $\overline{x^2}/\sigma_v^2$. The maximum error is only about 1.84 dB.

It is very useful in weather observation that the intensity of the weather echo can be obtained with such small error.

In the prior art, the intensity of the weather echo could be hardly obtained when great ground clutter exists. Even if it is measured, the error was so great that the rain amount calculated from the measured value was not so reliable.

From above statements it is noted that the intensity or the mean power of the weather echo can be obtained if the AC power of the linear-detection output is measured. The obtained intensity is highly reliable even if the ground clutter exists together with the weather echo. Thus, the rain amount can be calculated with a higher reliability.

On the other hand, assuming that the amplitude of the echo signal from a certain echoing volume is x(t) at a time t and is v(t − T) at a time apart from the time t by a time period T during which fluctuation of the weather target becomes independent, the amplitude difference y(t) between x(t) and v(t − T) is written by, $$y(t) = v(t) - v(t - T) \quad (14)$$

The mean value of y(t) is $$\overline{y(t)} = \overline{v(t) - v(t - T)} = \overline{v(t)} - \overline{v(t - T)} = 0.$$

Therefore the variance $\sigma_y^2$ of y(t) is $$\begin{aligned}\sigma_y^2 &= \overline{(y(t) - \overline{y(t)})^2} \\ &= \overline{y(t)^2} \\ &= \overline{(v(t) - v(t - T))^2}\end{aligned} \quad (15)$$

As described above, the variance $\sigma_v^2$ of the echo signal is $$\sigma_v^2 = \overline{(v - \overline{v})^2} \quad (16)$$

On the other hand, since the fluctuation of the amplitude v(t) is $(v(t) - \overline{v})$, the equation (15) is rewritten as follows;

$$\sigma_y^2 = \overline{[\{\overline{v} + (v(t) - \overline{v})\} - \{\overline{v} + (v(t-T) - \overline{v})\}]^2}$$
$$= \overline{(x(t) - \overline{x})^2} + \overline{(x(t - T) - \overline{x})^2} + \overline{(x(t) - \overline{x})x(t - T) - \overline{x})}$$

Since the time T is long enough that the fluctuation becomes independent, $(v(t) - \overline{v})(v(t - T) - \overline{v})$ is zero. And in view of the equation (16), $$\overline{(v(t) - \overline{v})^2} = \sigma_v^2$$
$$\text{and } \overline{(v(t - T) - \overline{v})^2} = \sigma_v^2$$

therefore, $$\sigma_y^2 = 2\sigma_x^2 \quad (17)$$

It will be noted that the variance $\sigma_y^2$ is an AC power of the amplitude-difference signals and that the variance $\sigma_y^2$ is proportional to the AC power $\sigma_x^2$ of the echo signal.

Accordingly, the AC power of the echo signals or linear-detection output can be obtained from an amplitude-difference signal between each one echo signal and another signal which are apart from each other by a time period during which fluctuation becomes independent.

According to the above described knowledge, this invention provides a method for measuring the intensity of the weather echo from the received wave in the weather pulse radar.

According to the method of this invention, the received wave in the weather pulse radar is linear-detected to provide successive pulse-like echo signals. Each one echo signal is compared with a successive one to provide an amplitude difference signal.

The amplitude comparison may be made not between successive two pulses but between two pulses which are apart from one another by two or more times the pulse radiating period in the weather radar. It is important that two echo pulses are apart from one another by a time period during which the fluctuation of the weather target becomes independent.

It will be noted that the amplitude difference signal does not include ground clutter and the DC component of the weather echo, but is a signal due to the fluctuation of the weather target.

Then, the power of the amplitude-difference signal is measured. The measured power gives the AC power of the weather echo, as shown by the equation (17). And the mean power of the weather echo is calculated according to the equations (13) or (14), or to FIG. 1.

If the amplitude signals are unipolarized or squared and, thereafter, are averaged, the AC power $\sigma_v^2$ of the weather echo signal is readily obtained from measuring the average amplitude of the averaged signals, as will be noted from the description of the embodiments in FIGS. 2-5, of the device of this invention.

Figure 2:
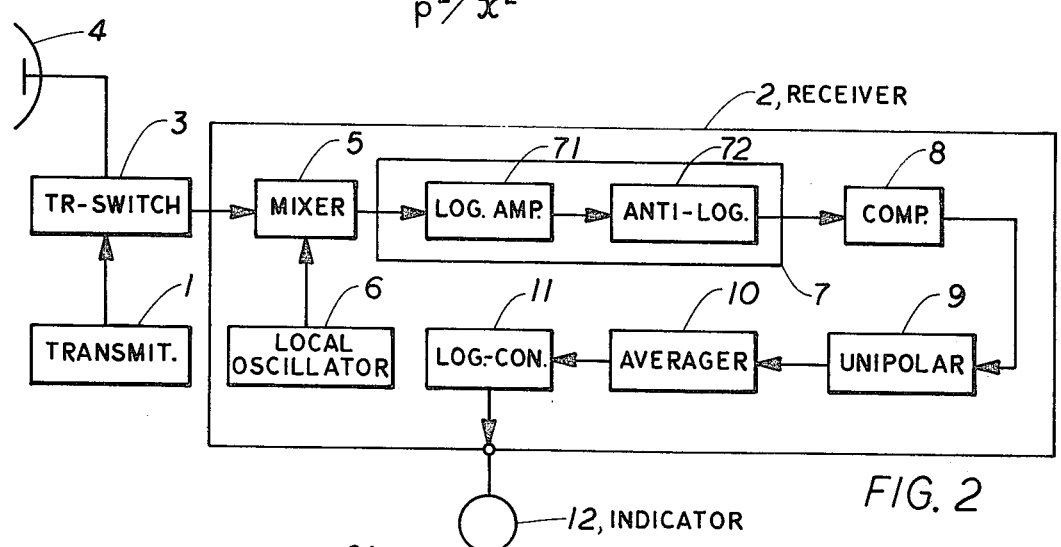
FIG. 2 shows a block diagram of an embodiment of this invention.

FIG. 2 shows a block diagram of an embodiment of the invention. The embodiment includes a known weather pulse radar which comprises a microwave pulse transmitter 1, a receiver 2, a TR (transmit-receive) switch 3 and an antenna 4. The receiver 2 comprises a mixer 5, a local oscilator 6, a linear-detection circuit 7, an amplitude comparator 8, a unipolarizer 9, an averager 10 and a logarithmic converter 11.

The linear-detection circuit 7 may comprise a logarithmic amplifier 71 and an anti-logarithmic circuit 72.

In known weather radar, the logarithmic amplifier 71 is usually used in the receiver for detecting and simultaneously amplifying weather echo signals without saturation to provide a detected signal having a logarithmic amplitude. Accordingly, the linear-detection output can be obtained from the known radar system by coupling the anti-logarithmic circuit 72 to the output of the logarithmic amplifier 71.

As the anti-logarithmic circuit, a logarithmic diode circuit or a ROM (read-only-memory) may be used.

The amplitude of the output from the circuit 72 is represented by the probability density function as given by equation (10).

For deriving the AC component of the weather echo from the linear-detection output, an echo pulse comparator 8 is coupled to the output of the anti-logarithmic circuit 72.

Figure 3:
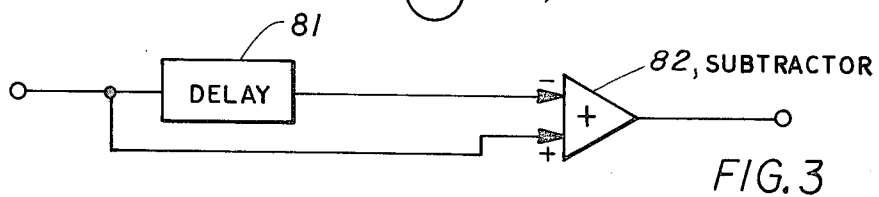
FIG. 3 shows an embodiment of the two pulse comparator in FIG. 2.

Referring to FIG. 3 in which a simple embodiment of the comparator 8 is shown, the comparator 8 comprises a delay line 81 and a subtractor 82. The delay line 81 delays the input echo pulse by a time (several milli- seconds) equal to the pulse radiating period in the weather radar. The subtractor 82 subtracts the delayed echo pulse from the present echo pulse to provide an amplitude difference signal. Namely, the amplitude difference between one echo pulse and the next is detected, and the difference signal gives the AC component signal of the weather echo.

The delay time of the delay line 81 should be determined to be a time equal to one or more integer times of the pulse radiating period in the weather radar 30 that two echo pulses may be compared which are apart from one another by a time period during which the fluctuation becomes independent.

As the comparator 8, other known circuits such as canceler circuits in the envelope-processing MTI system can be employed.

Referring to FIG. 4 which shows signal waveforms at various points in the embodiment in FIG. 2, only three successive signals corresponding to the pulses successively radiated from the transmitter, are shown, for simplicity.

The waveforms of FIGS. 4(a), 4(b) and 4(c) show outputs from the anti-logarithmic circuit 72 in three different cases. FIG. 4(a) shows a case where weather echo 13, 14, and 15 exist alone, FIG. 4(b) shows another case where ground clutter 16, 17, and 18 exists alone, and FIG. 4(c) shows the other case weather echo and ground clutter exist in combination.

In case the output of the circuit 72 has the waveform of FIG. 4(c), the output from the comparator 8 has a waveform as shown in FIG. 4(d). Namely, the ground clutter and the DC component of the weather echo are eliminated and the AC component of the weather echo is derived.

The variance of the AC power $\sigma_v^2$ of the AC component is proportional to the mean power $\overline{x^2}$ of the weather echo as described hereinabove. Therefore, the AC component signals may be inputted into a computer for obtaining weather information thereby.

Referring back to FIG. 2, in order to unipolarize the AC signal from the comparator 8, a unipolarizer 9 is connected to the output of the comparator. As the unipolarizer 9, a full-wave rectifier circuit is used. The output waveform of the unipolarizer 9 is shown in FIG. 4(e).

It will be readily noted that the power of the unipolarized signals is maintained at $\sigma_v^2$ and that the average amplitude of the output signal of the unipolarizer 9 corresponds to an effective amplitude $\sigma_v$ of the AC component of the weather echo.

The averager circuit 10 is for averaging amplitudes of the successive unipolarized signals. A low-pass filter and/or video integrator is used for the averager 10. The waveform of the output from the averager 10 is shown in FIG. 4(f).

The probability density function p(z) of the amplitude z of the unipolarized signal is given by, $$p(z) = \frac{2}{\sqrt{2\pi}\sqrt{2}\,\sigma_v} \exp\left(-\frac{z^2}{4\sigma_v^2}\right). \quad (18)$$

The mean value $\bar{z}$ is $$\bar{z} = \sqrt{\frac{4}{\pi}}\,\sigma_v$$

It will be seen that the mean value $\bar{z}$ gives a root value of the AC power $\sigma_v^2$ of the weather echo.

Accordingly, by measuring the amplitude of the averaged signal, the AC power $\sigma_y^2$ of the weather echo, the mean power $\overline{x^2}$ of the weather echo are calculated, so that the rain amount is calculated.

If the scale of a device for measuring the average amplitude is calibrated by rain amount according to the relationship as above described, the rain amount at a given range is known on real time.

The output from the averager 10 is logarithmic-converted at the converter 11 to provide lagarithmic signals, which are applied to known radar indicators 12 such as PPI, A-scope indicator, iso-echo indicator to display weather pattern and/or intensity of the weather echo.

The amplitude of the signal from the logarithmic converter 11 corresponds to the effective amplitude $\sigma_y$ of the AC component of the weather echo but is logarithmic converted. Therefore, if an A-scope display having a dB scale is used, the AC power $\sigma_y^2$ is obtained as twice the measured value on the A-scope display. And the mean power $\overline{x^2}$ of the weather echo is calculated by adding a constant to the value of $\sigma_y^2$. Thus, the rain amount can be calculated from the mean power $\overline{x^2}$.

It will be noted that the rain amount is known on real time by calibrating a rain amount scale on the A-scope display according to the above described relationship.

Figure 5:
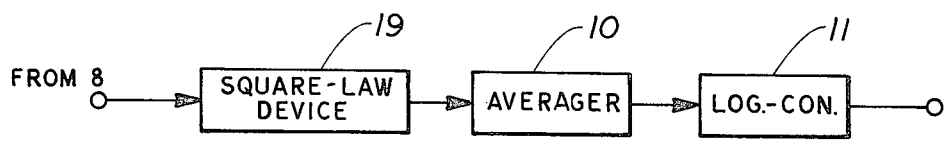
FIG. 5 shows a block diagram of another embodiment of this invention.

FIG. 5 shows a block diagram of another embodiment of the invention in which different portions are shown from the embodiment in FIG. 2.

In the FIG. 5 embodiment, the amplitude-difference signals from the comparator 8 are squared by a square-law device 19 having the transfer characteristic $y = ax^2$. Such a square-law device 19 can be realized by the use of a known amplitude multiplier.

The amplitude of the output of the square law device 19 at a range is given by $y(t)^2$ if the amplitude of the amplitude-difference signal is given by the equation (14).

The output signals are averaged at the averager 10. The amplitude of the averaged signal is given by $\overline{y(t)^2}$, which is equal to $\sigma_y^2 = 2\sigma_x^2$, as seen from the equations (15) and (17).

Therefore, the AC power of the weather echo can be obtained by measuring the amplitude of the averaged signal.

If a logarithmic converter 11 is employed, the AC power can be obtained on dB value.

The rain amount and weather pattern can be obtained on real time by use of known indicators.

In this invention, even if ground clutter exists together with weather echo, signals having an amplitude corresponding to the intensity of the weather echo can be obtained by deriving out the AC component of the weather echo, so that it is possible to measure the intensity of the weather echo which exists together with the ground clutter. This is realized by the use of simple known circuits. Therefore, a more reliable weather observation can be possible.

What is claimed is:

1. In a method for obtaining rain information from the mean power of the weather echo signal in a weather pulse radar system, the improvement comprising:
   obtaining echo signals by linear-detection of received waves in the radar system, each echo signal being an evelope signal of each received wave,
   comparing each one of successive echo signals with another later one which is spaced apart from said each one echo signal by a time period that the fluctuation of weather echo signals is independent to generate amplitude-difference signals to eliminate ground clutter and the DC component of the weather echo signal,
   measuring the variance of the amplitude-difference signals, said variance being proportional to the mean power of the echo signal, and
   calculating the mean power of the weather echo signal from said variance, thereby obtaining rain information.

2. A method for rejecting ground clutter from echo signals in a weather pulse radar system, comprising:
   linear-detecting the received wave in the radar system to obtain spaced detected pulse signals, at least some of which are weather echo signals, and
   comparing each two detected pulse signals which are spaced apart from one another by a time period that the fluctuation of weather echo signals is independent to generate an amplitude-difference signals to eliminate the ground clutter and the DC component of the weather echo signal, the variance of the amplitude-difference signals being proportional to the mean power of the weather echo, thereby obtaining signals corresponding to the mean power of the weather echo.

3. In a weather radar system comprising a pulse radar transmitter and receiver device for detecting a weather echo and obtaining rain information from the mean value of the power of the weather echo signals, the improvement comprising:
   means for linear-detecting the wave received at the radar receiver device to provide echo signals including weather echo signals and/or ground clutter,
   means coupled to said linear-detecting means for comparing each one of successive echo signals from said linear-detecting means with another later echo signal which is spaced apart from said one echo signal by a given time period that fluctuation of weather echo signals is independent to generate an amplitude-difference signal to eliminate the ground clutter and the DC component of the weather echo signal,
   means coupled to said comparing means for unipolarizing the amplitude-difference signals, and
   means coupled to said unipolarizing means for averaging the successive unipolarized signals to provide averaged signals having an amplitude corresponding to the mean power of the weather echo.

4. The system of claim 3, wherein said comparing means comprises means for delaying input signals from said linear-detecting means by said given time period, and means for detecting a difference between the input signal from said linear-detecting means and the delayed signal from said delaying means.

5. The system of claim 3, which further comprises means coupled to said averaging means for logarithmic converting the averaged signals from said averaging means to provide logarithmic signals, and radar indicator means to which the logarithmic signals are applied for display.

6. The system of claim 3 wherein echo signals which are derived from received waves are obtained as logarithmic signals, and said linear-detecting means includes anti-logarithmic means for converting the logarithmic signals into said echo signals which include said weather echo signals and/or ground clutter, the echo signal output of said anti-logarithmic means being coupled to said comparing means.

7. The system of claim 6, wherein said comparing means comprises means for delaying input signals from said anti-logarithmic means by said given time period, and means for detecting a difference between the input signal from said anti-logarithmic means and the delayed signal from said delaying means.

8. The system of claim 6, which further comprises means coupled to said averaging means for logarithmic converting the averaged signals from said averaging means to provide logarithmic signals, and radar indicator means to which the logarithmic signals are applied for display.

9. In a weather radar system comprising a pulse radar transmitter and receiver device for detecting a weather echo and obtaining rain information from the mean value of the power of the weather echo signal, the improvement comprising:

means for linear-detecting the wave received at the radar receiver device to provide echo signals including weather echo signals and/or ground clutter, means coupled to said linear-detecting means for comparing each one of successive echo signals from said linear-detecting means with another later echo signal which is spaced apart from said one echo signal by a given time period that fluctuation of weather echo signals is independent to generate an amplitude-difference signal to eliminate the ground clutter and the DC component of the weather echo signal, means coupled to said comparing means for squaring the amplitude-difference signal, and means coupled to said squaring means for averaging the successive squared signals to provide averaged signals having an amplitude proportional to the mean power of the weather echo.

10. The system of claim 9, wherein said comparing means comprises means for delaying input signals from said linear-detecting means by said given time period, and means for detecting a difference between the input signal from said linear-detecting means and the delayed signal from said delaying means.

11. The system of claim 9, which further comprises means coupled to said averaging means for logarithmic converting the averaged signals from said averaging means to provide logarithmic signals, and radar indicator means to which the logarithmic signals are applied for display.

12. The system of claim 9 wherein echo signals which are derived from received waves are obtained as logarithmic signals, and said linear-detecting means includes anti-log-arithmic means for converting the logarithmic signals into said echo signals which include said weather echo signals and/or ground clutter, the echo signal output of said anti-logarithmic means being coupled to said comparing means.

13. The system of claim 12, wherein said comparing means comprises means for delaying input signals from said anti-logarithmic means by said given time period, and means for detecting a difference between the input signal from said anti-logarithmic means and the delayed signal from said delaying means.

14. The improvement as claimed in claim 12, which further comprises means coupled to said averaging means for logarithmic converting the averaged signals from said averaging means to provide logarithmic signals, and radar indicator means to which the logarithmic signals are applied for display.

* * * * *

UNITED STATES PATENT AND TRADEMARK OFFICE
CERTIFICATE OF CORRECTION

PATENT NO. : 4,139,847

DATED : February 13, 1979

INVENTOR(S) : Toshio SHIMIZU et al

Page 1 of 3

It is certified that error appears in the above-identified patent and that said Letters Patent are hereby corrected as shown below:

In the heading of the patent, change the first inventor's last name to --Shimizu--;

Column 6, line 25, change "x(t)" to --v(t)--;

line 30, change equation to read $$\overline{y(t)} = \overline{v(t) - v(t-T)} = \overline{v(t)} - \overline{v(t-T)} = 0.$$

line 51, change equation to read $$-- = (v(t) - \overline{v})^2 + (v(t-T) - \overline{v})^2 - 2(v(t) - \overline{v})(v(t-T) - \overline{v})--;$$

Column 8, line 10, change "radar 30" to --radar so--;

Column 9, line 65, change "evelope" to --envelope--.

UNITED STATES PATENT AND TRADEMARK OFFICE
CERTIFICATE OF CORRECTION

PATENT NO. : 4,139,847

DATED : February 13, 1979

INVENTOR(S) : Toshio SHIMIZU et al

It is certified that error appears in the above-identified patent and that said Letters Patent are hereby corrected as shown below:

Column 6, line 21, change "x(t)" to --v(t)--;
change equation (17) on line 62 to read
$$\sigma_y^2 = 2\sigma_v^2$$
next to last line, change "$\sigma_x^2$" to --$\sigma_v^2$--;

Column 7, line 31, change "(14)" to --(4)--;

Column 9, line 41, change "$2\sigma_x^2$" to --$2\sigma_v^2$--.

UNITED STATES PATENT AND TRADEMARK OFFICE
CERTIFICATE OF CORRECTION

PATENT NO. : 4,139,847

DATED : February 13, 1979

INVENTOR(S) : Toshio SHIMIZU et al

It is certified that error appears in the above-identified patent and that said Letters Patent are hereby corrected as shown below:

Column 9, line 3, change "$x^2$" to $--\overline{x^2}--$;

Column 9, line 21, change "$x^2$" to $--\overline{x^2}--$.

Signed and Sealed this

Eleventh Day of December 1979

[SEAL]

Attest:

SIDNEY A. DIAMOND

Attesting Officer     Commissioner of Patents and Trademarks